United States Patent
Akiyama (10) Patent No.: US 9,067,558 B2
(45) Date of Patent: Jun. 30, 2015

(54) VEHICLE SIDE AIRBAG DEVICE

(71) Applicant: Fumito Akiyama, Toyota (JP)

(72) Inventor: Fumito Akiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/220,468

(22) Filed: Mar. 20, 2014

(65) Prior Publication Data

US 2014/0284907 A1    Sep. 25, 2014

(30) Foreign Application Priority Data

Mar. 22, 2013 (JP) ................................ 2013-060308

(51) Int. Cl.
| | |
|---|---|
| B60R 21/207 | (2006.01) |
| B60R 21/201 | (2011.01) |
| B60R 21/231 | (2011.01) |
| B60R 21/16 | (2006.01) |

(52) U.S. Cl.
CPC ..... *B60R 21/207* (2013.01); *B60R 2021/23146* (2013.01); *B60R 2021/2076* (2013.01); *B60R 21/201* (2013.01); *B60R 2021/161* (2013.01)

(58) Field of Classification Search
CPC    B60R 21/201; B60R 21/207; B60R 21/2176; B60R 2021/2076; B60R 2021/21531; B60R 2021/23146
USPC .......................................... 280/730.2, 728.3
See application file for complete search history.

(56) References Cited

U.S. PATENT DOCUMENTS

| | | | |
|---|---|---|---|
| 6,450,528 B1* | 9/2002 | Suezawa et al. ........... | 280/730.2 |
| 6,740,607 B2* | 5/2004 | Veiga et al. .................. | 442/149 |
| 7,168,733 B2* | 1/2007 | Kumagai et al. ........... | 280/730.2 |
| 7,540,529 B2* | 6/2009 | Tracht et al. ................ | 280/730.2 |
| 7,578,520 B2* | 8/2009 | Palo et al. ................... | 280/730.2 |
| 7,954,846 B2* | 6/2011 | Iwayama et al. ........... | 280/730.2 |
| 8,439,394 B2* | 5/2013 | Tracht ......................... | 280/728.3 |
| 8,523,221 B2* | 9/2013 | Muller ......................... | 280/730.2 |
| 8,573,635 B2* | 11/2013 | Festag et al. ................ | 280/730.2 |
| 8,596,678 B2* | 12/2013 | Ravenberg et al. ........... | 280/736 |
| 8,596,679 B2* | 12/2013 | Horikawa et al. ........... | 280/743.2 |
| 2002/0130495 A1* | 9/2002 | Lotspih et al. ............. | 280/730.2 |
| 2002/0163169 A1* | 11/2002 | Fischer ....................... | 280/730.2 |
| 2002/0187696 A1* | 12/2002 | Veiga et al. .................... | 442/76 |
| 2007/0057487 A1* | 3/2007 | Kim ............................ | 280/728.2 |
| 2010/0078919 A1 | 4/2010 | Naruse et al. | |
| 2010/0201108 A1* | 8/2010 | Iwayama et al. ........... | 280/730.2 |
| 2010/0295277 A1 | 11/2010 | Ochiai et al. | |
| 2011/0049850 A1* | 3/2011 | Horikawa et al. ............. | 280/736 |
| 2012/0175862 A1* | 7/2012 | Tracht ......................... | 280/730.2 |
| 2012/0175924 A1* | 7/2012 | Festag et al. ................ | 297/216.1 |

FOREIGN PATENT DOCUMENTS

| | | |
|---|---|---|
| JP | 2000-033845 A | 2/2000 |
| JP | 2001-206185 A | 7/2001 |

(Continued)

*Primary Examiner* — Drew Brown
(74) *Attorney, Agent, or Firm* — Gifford, Krass, Sprinkle, Anderson & Citkowski, P.C.

(57) ABSTRACT

A deployment guiding cloth is wound from an outside in the vehicle width direction, on an outer peripheral portion of a folded side airbag. This deployment guiding cloth extends toward a vehicle front side and is interposed between the side airbag that is partially deployed and a vehicle cabin side portion (a center pillar garnish and a door trim) before the side airbag is fully deployed.

20 Claims, 10 Drawing Sheets

(56) References Cited

FOREIGN PATENT DOCUMENTS

| | | |
|---|---|---|
| JP | 2004-224259 A | 8/2004 |
| JP | 2009-143379 A | 7/2009 |
| JP | 2010-105652 A | 5/2010 |
| JP | 2011-001051 A | 1/2011 |
| JP | 2011-240807 A | 12/2011 |
| JP | 2012-136155 A | 7/2012 |
| WO | 2004065178 A1 | 8/2004 |

* cited by examiner

VEHICLE SIDE AIRBAG DEVICE

INCORPORATION BY REFERENCE

The disclosure of Japanese Patent Application No. 2013-060308 filed on Mar. 22, 2013 including the specification, drawings and abstract is incorporated herein by reference in its entirety.

BACKGROUND OF THE INVENTION

1. Field of the Invention

The invention relates to a vehicle side airbag device.

2. Description of Related Art

Japanese Patent Application Publication No. 2011-240807 (JP 2011-240807 A) describes technology relating to a vehicle side airbag device. More specifically, a side airbag having a two-chamber structure is used which, when a side collision occurs, inflates and deploys in a general V-shape when viewed from above by a front portion that is pressed against from diagonally in front toward the chest of an occupant, and a rear portion that is pressed against from diagonally behind.

However, this related art has various problems. First, when a large occupant (i.e., an occupant with a large frame (build)) sits in a vehicle seat and moves the seat (changes the seat position) toward the rear of the vehicle, for example, a space between the occupant and a center pillar may become narrow. In this case, the side airbag will have difficulty inflating and deploying, which is problematic.

In addition, in the event of a side collision in which a vehicle body side portion largely deforms locally toward the vehicle cabin inside, such as a side collision with a pole or the like, a vertically-extending groove (gap) formed between a pillar garnish of the center pillar and a door trim of a front side door may open up in the longitudinal (front-rear) direction, and a large step may occur. In this case, when the side airbag inflates and deploys, it (i.e., the side airbag) tends to catch on this step, and as a result, it may take longer for the side airbag to fully deploy.

SUMMARY OF THE INVENTION

The invention thus provides a vehicle side airbag device capable of rapidly inflating and deploying a side airbag even if a space between a pillar garnish of an intermediate pillar and a seated occupant is narrow, or a large step occurs between the pillar garnish and a door trim.

A vehicle side airbag device according to a first aspect of the invention includes an inflator, a side airbag, and a deployment guiding member. The inflator ejects gas in response to being activated. The side airbag is housed folded in a seatback side portion. The side airbag inflates and deploys from the seatback side portion toward a vehicle front side by the gas being supplied from the inflator. The deployment guiding member is wound around the folded side airbag from an outside in a vehicle width direction. The deployment guiding member extends toward the vehicle front side and is interposed between the side airbag that is partially deployed and a vehicle cabin side portion before the side airbag is fully deployed.

According to the first aspect of the invention, when the inflator is activated, gas is ejected and this gas is supplied into the side airbag that is housed folded in the seatback side portion. Consequently, the side airbag inflates and deploys from the seatback side portion toward the vehicle front side.

As a result, the side airbag becomes interposed between the vehicle cabin side portion and the occupant, so the occupant is protected.

Here, in the invention, the deployment guiding member is wound around the folded side airbag from the outside in the vehicle width direction. The deployment guiding member extends toward the vehicle front side and is interposed between the side airbag that is partially deployed and the vehicle cabin side portion before the side airbag is fully deployed. Therefore, the deployment guiding member facilitates inflation and deployment of the side airbag toward the vehicle front side when a large occupant is seated in the vehicle seat and the space between the occupant and the center pillar is narrow, by reducing direct contact between the vehicle cabin side portion and the side airbag and increasing contact with the deployment guiding member. Also, when the vehicle is involved in a side collision with a pole or the like and a step forms between the pillar garnish and the door trim, the step is covered by the deployment guiding member, so the side airbag will not easily get caught on the step. That is, in any case, the inflation and deployment of the side airbag is smoothly guided by the deployment guiding member.

As described above, the vehicle side airbag device according to the first aspect of the invention has a beneficial effect in which it is able to rapidly inflate and deploy the side airbag even if the space between the center pillar and the occupant is narrow or there is a large step between the pillar garnish and the door trim.

In the first aspect of the invention, the deployment guiding member may extend toward the vehicle front side beyond a centerline in a seatback vertical direction of the fully deployed side airbag.

According to the above aspect, the deployment guiding member extends toward the vehicle front side beyond the centerline in the seatback vertical direction of the fully deployed side airbag, and is thus able to sufficiently accommodate for differences in the position of the center pillar or the like due to the type of vehicle, and differences in the seat position due to the physical size of the occupant, and the like.

The vehicle side airbag device according to the above aspect has a beneficial effect in which it is able to increase the effectiveness of the effect obtained by the first aspect of the invention.

In the first aspect, the side airbag may have an outer shape capable of restraining from a shoulder to a waist of an occupant, and the deployment guiding member may be arranged in a position corresponding to at least one of the shoulder and the waist of the occupant when viewed from a side. In the first aspect, the side airbag may be housed in an airbag case.

According to the above aspect, the side airbag has an outer shape capable of restraining from the shoulder to the waist of the occupant, so the shoulder and waist that need to be restrained early on are able to be rapidly restrained. Further, the deployment guiding member is arranged in a position corresponding to at least one of the shoulder and the waist of the occupant when viewed from the side, so the deployment guiding member extends toward the vehicle front side at a location where the space between the occupant and the vehicle cabin side portion is narrow.

The vehicle side airbag device according to the above aspect has a beneficial effect in which it is able to effectively guide the inflation and deployment of the side airbag.

According to the above aspect, the side airbag is housed in the airbag case, so it is possible to take advantage of the fact that the airbag case is used, i.e., that a reaction force surface when the side airbag inflates and deploys is obtained.

The vehicle side airbag device according to the above aspect has a beneficial effect in which it is able to take advantage of the fact that the airbag case is used, i.e., that a reaction force surface when the side airbag inflates and deploys is obtained.

In the first aspect, the side airbag may be housed in a resin airbag case and the deployment guiding member may be arranged along an inside surface or an outside surface of the airbag case.

According to the above aspect, the side airbag is housed in the resin airbag case, so it is possible to take advantage of the fact that the airbag case is used, i.e., that a reaction force surface when the side airbag inflates and deploys is obtained. Furthermore, in this case, the deployment guiding member is arranged along the inside surface or the outside surface of the airbag case, so the deployment guiding member will also not wrinkle.

The vehicle side airbag device according to the above aspect has a beneficial effect in which it is able to inflate and deploy the side airbag even more rapidly by ensuring the reaction force surface and preventing the deployment guiding member from wrinkling.

In the above aspect, the deployment guiding member may be arranged in a position corresponding to an area from the shoulder to the waist of the occupant when viewed from the side.

According to the above aspect, the deployment guiding member is arranged in a position corresponding to an area from the shoulder to the waist of the occupant when viewed from the side, so the deployment guiding member is also arranged in a position corresponding to the chest and abdomen of the occupant. In this way, in the invention, the area of the deployment guiding member is large, which is effective when the space between the occupant and the vehicle cabin side portion is relatively wide.

The vehicle side airbag device according to the above aspect has a beneficial effect in which it is able to smoothly guide the inflation and deployment operation of the side airbag by arranging the deployment guiding member over a wide area when the space between the occupant and the vehicle cabin side portion is relatively wide.

In the above aspect, the deployment guiding member may be arranged only in a position corresponding to two locations of the shoulder and the waist of the occupant when viewed from the side.

According to the above aspect, the deployment guiding member is arranged only in a position corresponding to two locations of the shoulder and the waist of the occupant when viewed from the side, so the deployment guiding member is able to be quickly arranged in locations where the space between the occupant and the vehicle cabin side portion is narrow, i.e., at the shoulder and the waist of the occupant. In this way, in the invention, the deployment guiding member is arranged corresponding only to the shoulder and waist, which is effective when the space between the occupant and the vehicle cabin side portion is relatively narrow.

The vehicle side airbag device according to the above aspect has a beneficial effect in which it is able to smoothly guide the inflation and deployment operation of the side airbag by arranging the deployment guiding member in a position that is particularly effective, when the space between the occupant and the vehicle cabin side portion is relatively narrow.

In the first aspect, an upper end portion of the airbag that is fully deployed may be positioned higher in a vehicle vertical direction than a door belt line of a side door, and a coating may be applied to a surface on an outside in the vehicle width direction of the deployment guiding member.

According to the above aspect, when the side airbag is fully inflated and deployed, the upper end portion of the side airbag is positioned higher in the vehicle vertical direction than the door belt line of the side door. Therefore, if a door glass of the side door breaks, glass fragments will probably strike the deployment guiding member, and moreover, will also probably strike the outside surface of the upper end portion of the side airbag. However, in this aspect of the invention, the coating is applied to the surface on the outside in the vehicle width direction of the deployment guiding member, so the deployment guiding member is inhibited or prevented from being damaged by the glass fragments.

The vehicle side airbag device according to the above aspect has a beneficial effect in which it is able to inhibit or prevent the deployment guiding member, and thus the side airbag, from being damaged when the side airbag is made larger in the vehicle vertical direction and the upper end portion is positioned higher in the vehicle vertical direction than the door belt line of the side door.

In the first aspect, the side airbag may be folded up together with the inflator and housed in a recessed portion formed in a seatback pad, and the deployment guiding member may be arranged around the folded side airbag. In the first aspect, a deployment length that is a length in a vehicle longitudinal direction of the deployment guiding member may be equal to or greater than a length in the vehicle longitudinal direction of the side airbag when the side airbag is inflated and deployed. In the above aspect, the deployment guiding member may be arranged on a front side in the vehicle longitudinal direction of the side airbag, with a portion of the deployment guiding member in a folded state.

According to above aspect, a recessed portion is formed in the seatback pad, and the side airbag is folded up together with the inflator and housed in this recessed portion. Therefore, there is no need to change the outer shape of the seatback.

The vehicle side airbag device according to the above aspect has a beneficial effect in which it is able to inhibit or prevent the design of the seatback from being restricted.

According to the above aspect, the deployment length that is a length in a vehicle longitudinal direction of the deployment guiding member is equal to or greater than a length in the vehicle longitudinal direction of the side airbag when the side airbag is inflated and deployed. Therefore, deployment is able to be guided for the entire length of the deployment length of the side airbag.

The vehicle side airbag device according to the above aspect has a beneficial effect in which it is able to guide deployment for the entire length of the deployment length of the side airbag.

According to the above aspect, the deployment guiding member is arranged on a front side in the vehicle longitudinal direction of the side airbag, with a portion of the deployment guiding member in a folded state. Therefore, the deployment guiding member is able to be compactly housed, and rapid deployment of the deployment guiding member is able to be promoted.

The vehicle side airbag device according to the above aspect has a beneficial effect in which it is able to compactly house the deployment guiding member, and promote rapid deployment of the deployment guiding member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

A vehicle side airbag according a first example embodiment of the invention will now be described with reference to FIGS. 1 to 6. In the drawings, arrow FR indicates a vehicle front side, arrow UP indicates a vehicle upward side, and arrow IN indicates an inside in a vehicle width direction.

Figure 1:
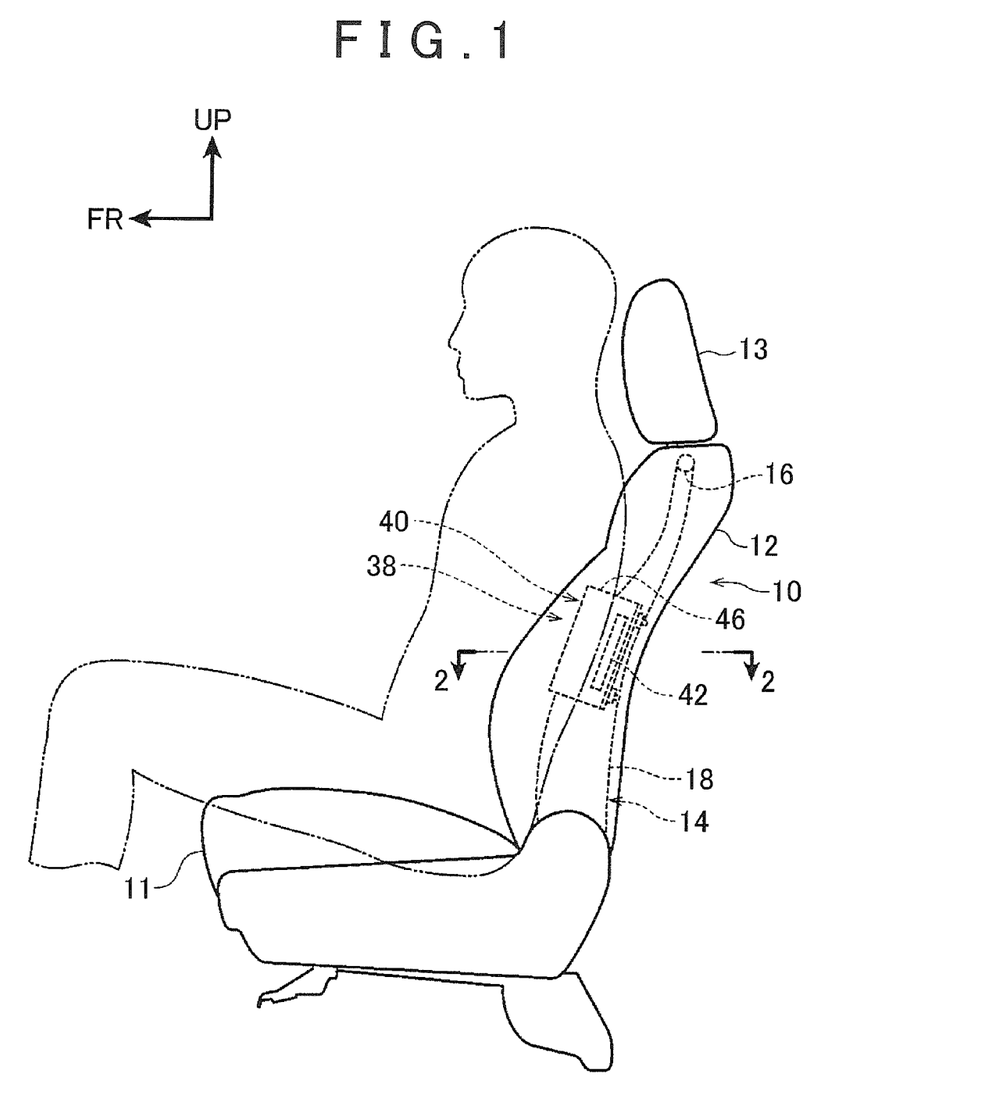
FIG. 1 is a side view of a vehicle seat provided with a vehicle side airbag device according to a first example embodiment of the invention.
Figure 2:
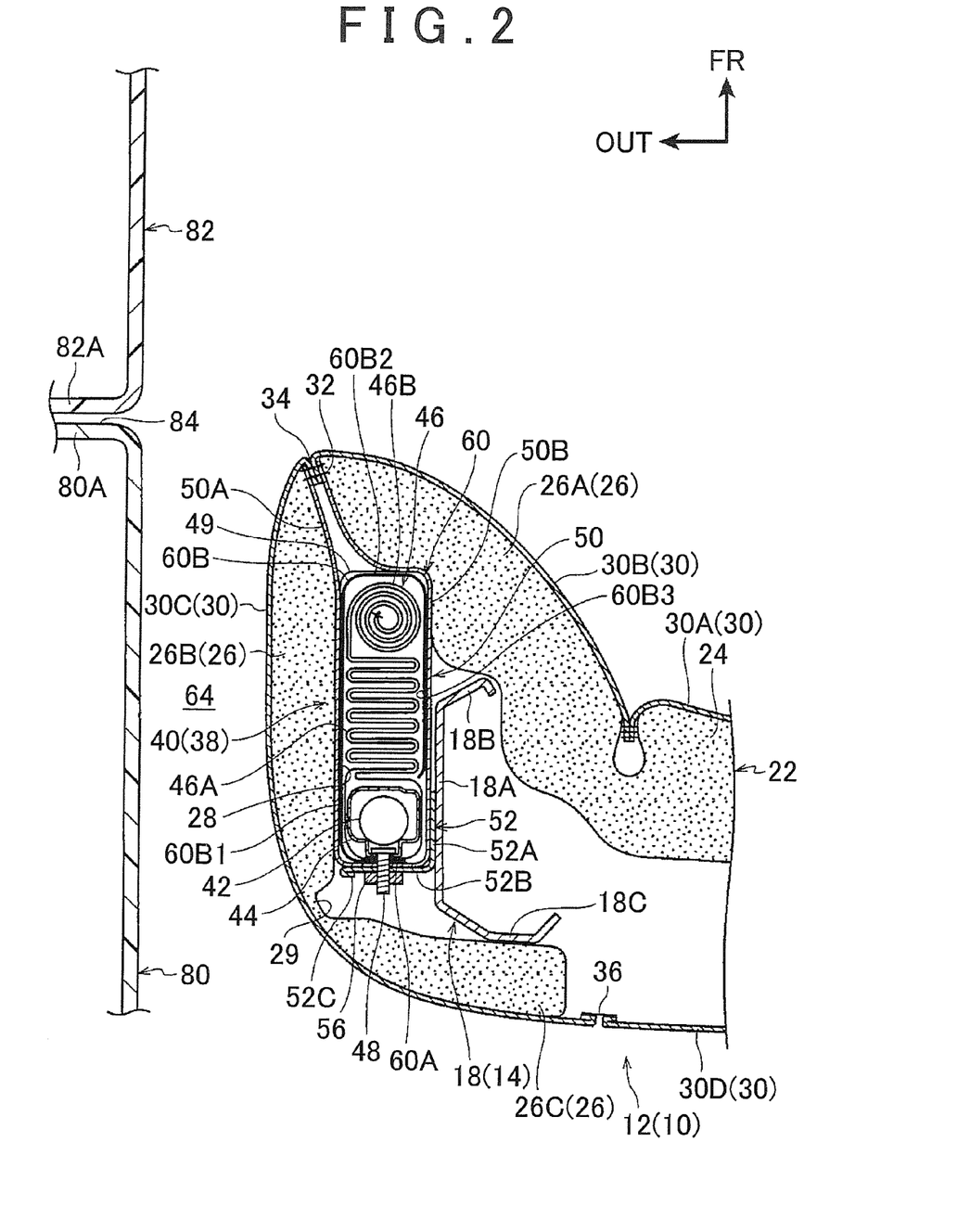
FIG. 2 is an enlarged top sectional view of the vehicle seat shown in FIG. 1 cut along line 2-2.

As shown in FIG. 1, a vehicle seat 10 includes a seat cushion 11 on which an occupant sits, a seatback 12 that is tiltably provided upright on a rear end portion of this seat cushion 11 and supports an upper body of the occupant, and a headrest 13 that is provided on an upper end portion of the seatback 12 and supports a head of the occupant. Also, as shown in FIG. 2, a center pillar garnish 80 that lines an inside in a vehicle width direction of a center pillar is arranged on an outside in the vehicle width direction of the seatback 12 of the vehicle seat 10. Furthermore, a door trim 82 that lines an inside in the vehicle width direction of a door inner panel of a front side door is arranged on the vehicle front side of the center pillar garnish 80. A small groove (gap) 84 is formed between a front wall portion 80A of the center pillar garnish 80 and a rear wall portion 82A of the door trim 82.

Returning to FIG. 1, the seatback 12 includes a metal seatback frame 14 that forms a frame. The seatback frame 14 includes a pipe-shaped upper frame 16 that is formed in an inverted U-shape when viewed from the front, and a pair of left and right side frames 18 that are welded to both left and right side portions of this upper frame 16. Lower end portions of the left and right side frames 18 are connected together in the vehicle width direction by a connecting rod, not shown, that is formed by a pipe member.

As shown in FIG. 2, each side frame 18 is formed such that a top sectional shape has a general C-shape by press-forming. More specifically, each side frame 18 is formed by a vertical wall portion 18A that extends along in a vehicle longitudinal direction in a top sectional view, a front wall portion 18B that is curved obtusely from a front end of this vertical wall portion 18A toward the inside in the vehicle width direction, and a rear wall portion 18C that is curved obtusely from a rear end of the vertical wall portion 18A toward the inside in the vehicle width direction and then extends in the vehicle width direction, with a terminal portion then being curved toward the vehicle front side. The side frame 18 will be described again in relation to a side airbag device 38 that will be described later.

A seatback pad 22 formed by a cushion of urethane foam or the like is arranged on the vehicle front side of the seatback frame 14. The seatback pad 22 mainly includes a front main pad portion 24 that is arranged on a front surface side of the seatback 12 and supports the upper body of a seated occupant, and a pair of left and right side pad portions 26 that are arranged on both sides in the vehicle width direction of this front main pad portion 24 and support the upper body of the seated occupant from both sides. The side pad portions 26 are integrally formed with the front main pad portion 24. Also, the side pad portions 26 are formed in shapes that bulge out farther toward the vehicle front side than a front surface of the front main pad portion 24. Moreover, each of the side pad portions 26 includes a pad front surface portion 26A arranged on the vehicle front side of the side frame 18, a pad side surface portion 26B arranged on the outside in the vehicle width direction of the side frame 18, and a pad rear surface portion 26C that is connected to the pad side surface portion 26B via a recess-shaped hinge portion 29 and is arranged on the vehicle rear side of the side frame 18. A housing portion 28 that is a substantially rectangular parallelepiped recessed portion for housing an airbag module 40 of the side airbag device 38 that will be described later is formed in an area surrounded by the pad front surface portion 26A, the pad side surface portion 26B, and the pad rear surface portion 26C.

The seatback pad 22 described above is covered by a cover 30. The cover 30 includes a front main cover 30A that covers the front main pad portion 24 from the vehicle front side, a front side cover 30B that covers the pad front surface portion 26A from the vehicle front side, a side cover 30C that covers the pad side surface portion 26B and the pad rear surface portion 26C from the outside in the vehicle width direction and the vehicle rear side, respectively, and a rear cover 30D that covers a rear surface side of the seatback 12 from the vehicle rear side. An outside terminal portion of the front side cover 30B and a front side terminal portion of the side cover 30C are sewn together by a thread 32 that will break under a tensile load of a predetermined value or greater, at a predetermined area in a vehicle vertical direction. This portion is a splitting portion 34. Also, a rear terminal portion of the side cover 30C and an outside terminal portion of the rear cover 30D are separably joined together by a fastener 36.

The airbag module 40 of the side airbag device 38 that activates when a side collision occurs is arranged on the outside in the vehicle width direction of the vertical wall portion 18A of the side frame 18 on the outside in the vehicle width direction (i.e., on the side opposite a vehicle body side portion) of the seatback frame 14 described above. The airbag module 40 is housed in the housing portion 28 described above in a side portion of the seatback pad 22. The airbag module 40 includes, as main portions, an inflator 42 that is formed in a generally circular cylinder-shape, a metal retainer 44 that covers the periphery of this inflator 42, a side airbag 46 that is folded up in a thin generally rectangular parallelepiped shape, and a deployment guiding cloth 60 that is arranged so as to cover a surface of the side airbag 46 that is folded up, which will be described in detail later.

To elaborate on the structures of these portions, a squib (an igniter), not shown, is arranged on one end portion in an axial direction of the inflator 42. Also, the inside of the inflator 42 is filled with a gas forming agent that produces a large amount of gas when combusted. In addition, coolant for cooling the high temperature gas that is generated, and a filter for removing particles created when the gas forming agent combusts, and the like are also housed in the inflator 42. The inflator 42 described above is a type that uses a gas forming agent, but a type of inflator that is filled with high pressure gas may also be used. Also, a gas ejection portion in which a plurality of gas ejection holes are formed in a peripheral wall portion is formed on the other end portion side in the axial direction of the inflator 42. The inflator 42 is connected to a controller (i.e., an airbag ECU), not shown, that is arranged in a center portion of a vehicle body floor. The controller is connected to side collision detection sensors, not shown, that are arranged in a side door and a vehicle body side portion such as a rocker or a center pillar or the like.

Also, the retainer 44 is formed in a cylindrical shape, and the inflator 42 is arranged inside the retainer 44. The retainer 44 is fixed to an outer peripheral portion of the inflator 42 by crimping. Furthermore, a pair of upper and lower stud bolts 48 are provided protruding toward the vehicle rear side from an outer peripheral rear portion of the retainer 44. The retainer 44 functions as a diffuser that rectifies the gas ejected from the gas ejection holes in the inflator 42 to a predetermined direction (for example, to both sides in the axial direction of the inflator 42). The stud bolts 48 may also be provided protruding from the inflator 42 instead of from the retainer 44.

Figure 4:
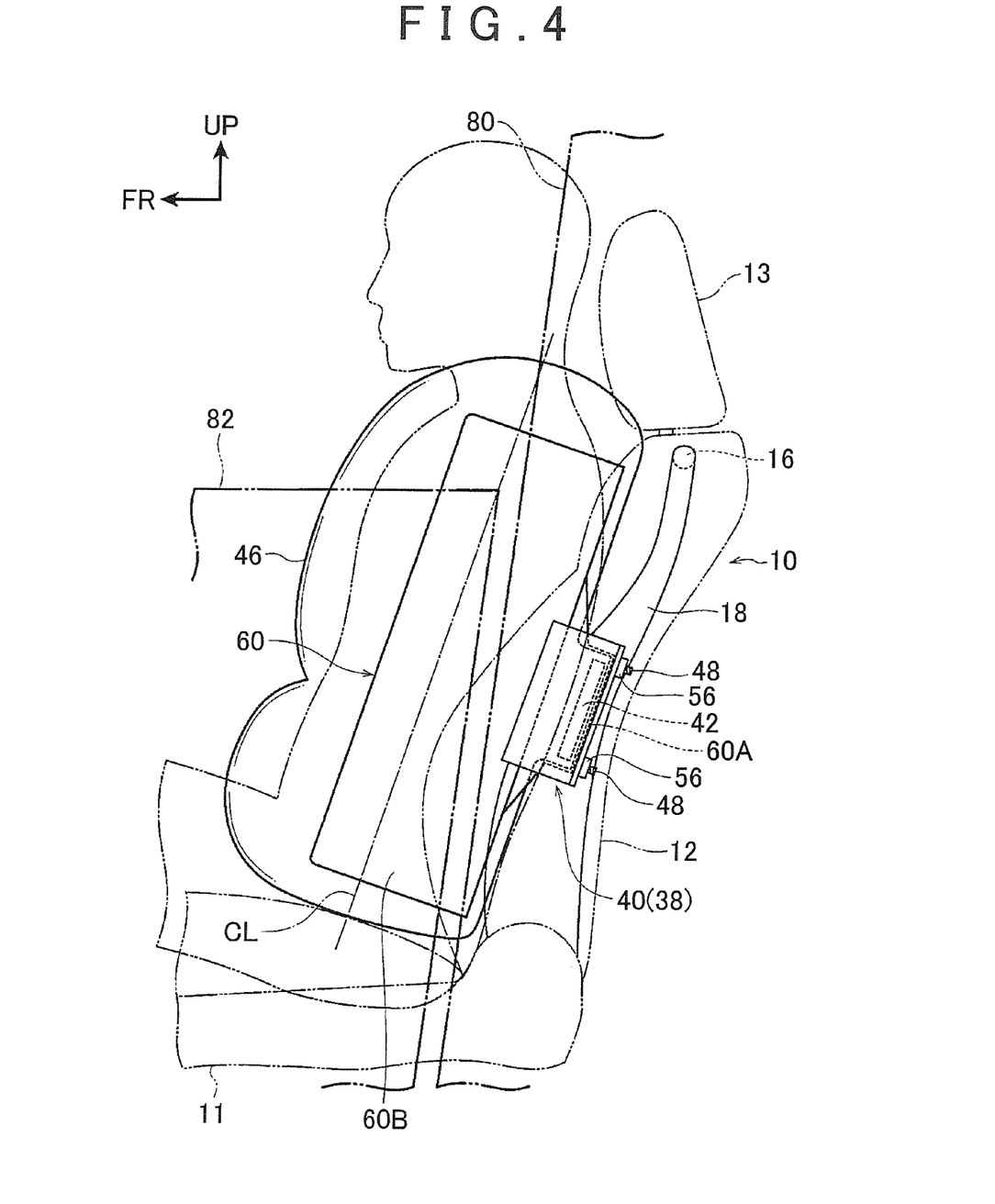
FIG. 4 is a side view corresponding to FIG. 1, of a side airbag that has been inflated and deployed by activation of the vehicle side airbag device shown in FIG. 1, in relation to a front side door.

The side airbag 46 forms an overall thin rectangular parallelepiped shape, and is formed with an outer shape that is capable of retraining from a shoulder to a waist of the seated occupant, for example (see FIG. 4). The inflator 42 and the retainer 44 are inserted inside this side airbag 46, and in this state the side airbag 46 is folded up in a thin rectangular parallelepiped shape. More specifically, the side airbag 46 is formed by an accordion-folded portion 46A arranged in the vehicle longitudinal direction of the inflator 42, and a roll-folded portion 46B arranged on the vehicle front side of this accordion-folded portion 46A. The side airbag 46 may also be folded by only an accordion fold or only a roll fold. The pair of upper and lower stud bolts 48 pass through the base fabric of the folded side airbag 46 and protruded out of it. The airbag module 40 formed in this way is wrapped with a package cloth 49.

Also, a webbing 50 is arranged on an outer peripheral portion of the airbag module 40 described above so as to cover the outer peripheral portion of the airbag module 40 from the vehicle rear side. Material that does not expand and contract easily is used for the webbing 50. The same material as that used for the side airbag 46 may be used, for example. Bolt insertion holes (not denoted by a reference character) for inserting the stub bolts 48 of the airbag module 40 are formed in a middle portion in the length direction of the webbing 50. The webbing 50 is divided into an outside webbing 50A and an inside webbing 50B, with the position in which the stub bolts 48 are formed as the boundary. The outside webbing 50A passes between the folded side airbag 46 and the pad side surface portion 26B, reaches the splitting portion 34, and is sewn to a front side terminal portion of the side cover 30C. Also, the inside webbing 50B passes between the folded side airbag 46 and the vertical wall portion 18A of the side frame 18, and between the side airbag 46 and the pad front surface portion 26A, reaches the splitting portion 34, and is sewn to an outside terminal portion of the front side cover 30B. As a result, the webbing 50 is formed in a loop shape in a top sectional view. Also, the airbag module 40 is arranged inserted into the loop of the webbing 50.

Meanwhile, a bracket 52 that is bent in an L-shape in a top sectional view is attached to the vertical wall portion 18A of the side frame 18 on the outside in the vehicle width direction of the seatback frame 14 described above. The bracket 52 includes a vertical wall portion 52A and a horizontal wall portion 52B. The vertical wall portion 52A of the bracket 52 is fixed by welding or the like to the vertical wall portion 18A of the side frame 18. Also, the horizontal wall portion 52B is arranged perpendicular to the vertical wall portion 18A of the side frame 18 toward the outside in the vehicle width direction. A pair of upper and lower bolt insertion holes (not denoted by a reference character) are formed in a middle portion, in the vehicle width direction, of this horizontal wall portion 52B. The stub bolts 48 are inserted from the vehicle front side toward the vehicle rear side into these bolt insertion holes and the bolt insertion holes in the webbing 50, and are fastened and fixed with nuts 56. A terminal portion 52C on the outside in the vehicle width direction of the horizontal wall portion 52B is folded back toward the vehicle rear side by hemming so as to prevent it from damaging the side airbag 46.

Figure 3:
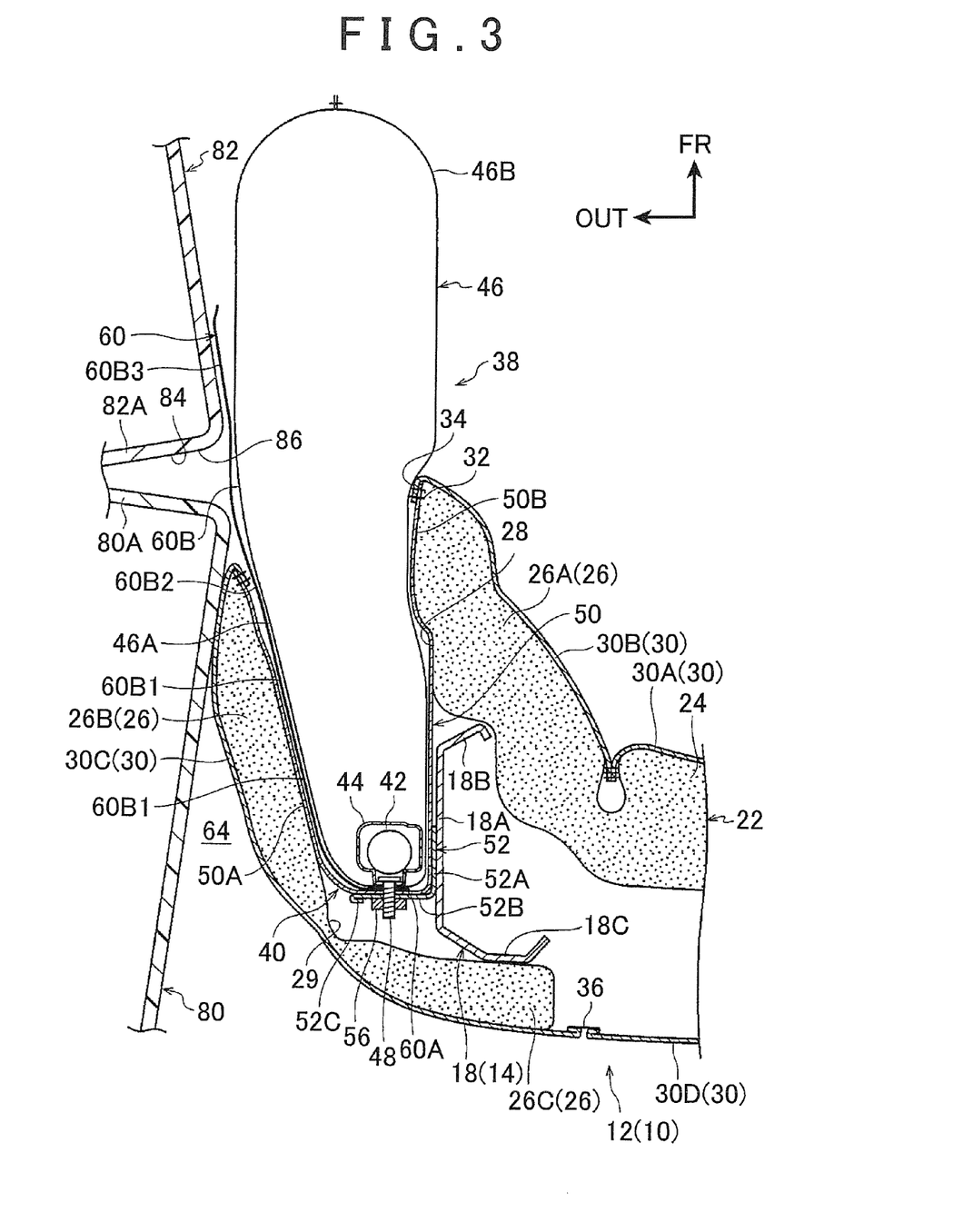
FIG. 3 is an enlarged top sectional view corresponding to FIG. 2, of the vehicle side airbag device shown in FIG. 2 in an activated state at the time of a side collision.

Here, the deployment guiding cloth 60 that serves as a deployment guiding member winds around the outer peripheral portion of the folded side airbag 46 from the outside in the vehicle width direction. As shown in FIGS. 2 to 4, the deployment guiding cloth 60 is formed by a fixed portion 60A arranged on a rear portion of the folded side airbag 46, and a main body portion 60B that is integrally formed with this fixed portion 60A and winds around the folded side airbag 46 from the outside in the vehicle width direction. Moreover, the main body portion 60B is formed by an outside portion 60B1 that covers a side surface on the outside in the vehicle width direction of the folded side airbag 46, a front end portion 60B2 that covers a front surface on the front side in the vehicle longitudinal direction of the side airbag 46, and an inside portion 60B3 that covers a side surface on the inside in the vehicle width direction of the side airbag 46.

A pair of upper and lower bolt insertion holes 62 into which the stub bolts 48 that protrude from the airbag module 40 are inserted are formed in the fixed portion 60A. A dimension in the vehicle vertical direction of the fixed portion 60A need simply be long enough that the pair of upper and lower stub bolts 48 are able to be inserted. Therefore, the dimension in the vehicle vertical direction of the fixed portion 60A is set to be shorter than the dimension in the vehicle vertical direction of the main body portion 60B. The stub bolts 48 are inserted into the bolt insertion holes 62 of this fixed portion 60A, and the main body portion 60B is wound around the side airbag 46 from the outside in the vehicle width direction. In this state, the airbag module 40 and the deployment guiding cloth 60 are wrapped with the package cloth 49.

Also, as shown in FIG. 4, the main body portion 60B of the deployment guiding cloth 60 extends beyond a centerline CL in the seatback vertical direction of the fully deployed side airbag 46, to the vehicle front side. Also, the deployment guiding cloth 60 is arranged in a position corresponding to both the shoulder and waist of the occupant (i.e., a position corresponding to an area from the shoulder to the waist of the occupant) when viewed from the side.

(Operation and Effects of the Example Embodiment)

Next, the operation and effects of this example embodiment will be described.

When a vehicle equipped with the vehicle seat 10 having the structure described above is involved in a side collision, the side collision is detected by the side collision detection sensor, not shown, and a detection signal is output to the controller. In the controller, it is determined whether the side airbag device 38 should be activated. If it is determined that the side airbag device 38 should be activated, a predetermined current is sent to the squib of the inflator 42 of the side airbag device 38. As a result, the inflator 42 activates and produces a large amount of gas. The produced gas is ejected from the gas ejection portion of the inflator 42, and this gas is supplied into the side airbag 46 that is housed folded up in the side portion on the outside in the vehicle width direction of the seatback 12. As a result, the side airbag 46 starts to inflate, and tension is transmitted to the splitting portion 34 of the cover 30 via the webbing 50. As a result, the splitting portion 34 splits and the inflator 42 inflates and deploys from the side portion on the outside in the vehicle width direction of the seatback 12 toward the vehicle front side. As a result, the side airbag 46 becomes interposed between a vehicle cabin side portion (i.e., the center pillar garnish 80 and the door trim 82) and the upper body of the seated occupant, thus protecting the upper body of the seated occupant from impact.

Here, in this example embodiment, with the folded side airbag 46, the fixed portion 60A of the deployment guiding cloth 60, together with the inflator 42, are fastened to the bracket 52, and the main body portion 60B of the deployment guiding cloth 60 is wound around from the outside of the vehicle width direction of the inflator 42. Therefore, when the cover 30 splits at the splitting portion 34, the main body portion 60B of the deployment guiding cloth 60 extends to the vehicle front side. More specifically, the front end portion 60B2 is pushed to the vehicle front side by the partially inflated, and consequently, the inside portion 60B3 pivots to the outside in the vehicle width direction (i.e., deploys such that the rear end portion of the inside portion 60B3 turns to the outside in the vehicle width direction centered around the front end portion). As a result, the deployment guiding cloth 60 extends toward the vehicle front side and is interposed between the side airbag 46 that is partially deployed and the vehicle cabin side portion before the side airbag 46 is fully deployed. Therefore, the deployment guiding cloth 60 facilitates inflation and deployment of the side airbag 46 toward the vehicle front side when a large occupant is seated in the vehicle seat 10 and the space 64 between the occupant and the center pillar garnish 80 is narrow, by reducing direct contact between the vehicle cabin side portion and the side airbag 46 and increasing contact with the deployment guiding cloth 60. Also, when the vehicle is involved in a side collision with a pole or the like and a step 86 forms as a result of a large groove (gap) 84 opening between the center pillar garnish 80 and the door trim 82, the step 86 is covered by the deployment guiding cloth 60, so the side airbag will not easily get caught on the step 86. That is, in any case, the inflation and deployment of the side airbag 46 is smoothly guided by the deployment guiding cloth 60.

In this way, the vehicle side airbag device 38 according to this example embodiment is able to rapidly inflate and deploy the side airbag 46 even if the space 64 between the center pillar garnish 80 and the occupant is narrow or there is a large step 86 between the center pillar garnish 80 and the door trim 82.

Also, in this example embodiment, the deployment guiding cloth 60 extends toward the vehicle front side beyond the centerline CL in the seatback vertical direction of the fully deployed side airbag 46, and is thus able to sufficiently accommodate for differences in the position of the center pillar or the like due to the type of vehicle, and differences in the seat position due to the physical size of the occupant, and the like. As a result, the effectiveness of the effect described above is able to be increased.

Moreover, in this example embodiment, the side airbag 46 has an outer shape capable of restraining from the shoulder to the waist of the occupant, so the shoulder and waist that need to be restrained early on are able to be rapidly restrained. Further, the deployment guiding cloth 60 is arranged in a position corresponding to both the shoulder and the waist of the occupant when viewed from the side, so the deployment guiding cloth 60 extends toward the vehicle front side at a location where the space 64 between the occupant and the vehicle cabin side portion is narrow. As a result, inflation and deployment of the side airbag 46 are able to be effectively guided.

Also, in this example embodiment, the deployment guiding cloth 60 is arranged in a position corresponding to an area from the shoulder to the waist of the occupant when viewed from the side, so the deployment guiding cloth 60 is also arranged in a position corresponding to the chest and abdomen of the occupant. In this way, in this example embodiment, the area of the deployment guiding cloth 60 is large, which is effective when the space 64 between the occupant and the vehicle cabin side portion is relatively wide. Therefore, according to this example embodiment, it is possible to smoothly guide the inflation and deployment operation of the side airbag 46 by arranging the deployment guiding cloth 60 over a wide area when the space 64 between the occupant and the vehicle cabin side portion is relatively wide.

Furthermore, in this example embodiment, the housing portion 28 for housing the airbag module 40 is formed in the side portion on the outside in the vehicle width direction of the seatback pad 22, and the side airbag 46 is housed, folded together with the inflator 42, in this housing portion 28. Therefore, there is no need to change the outer shape of the seatback 12. As a result, with this example embodiment, it is possible to inhibit or prevent the design of the seatback 12 from being restricted.

In the example embodiment described above, the deployment guiding cloth 60 in which the main body portion 60B is arranged in a position corresponding to an area from the shoulder to the waist of the occupant is used, but the invention is not limited to this as long as the structure is such that the main body portion of the deployment guiding cloth is arranged in a position corresponding to at least one of the shoulder and the waist of the occupant when viewed from the side.

Figure 5:
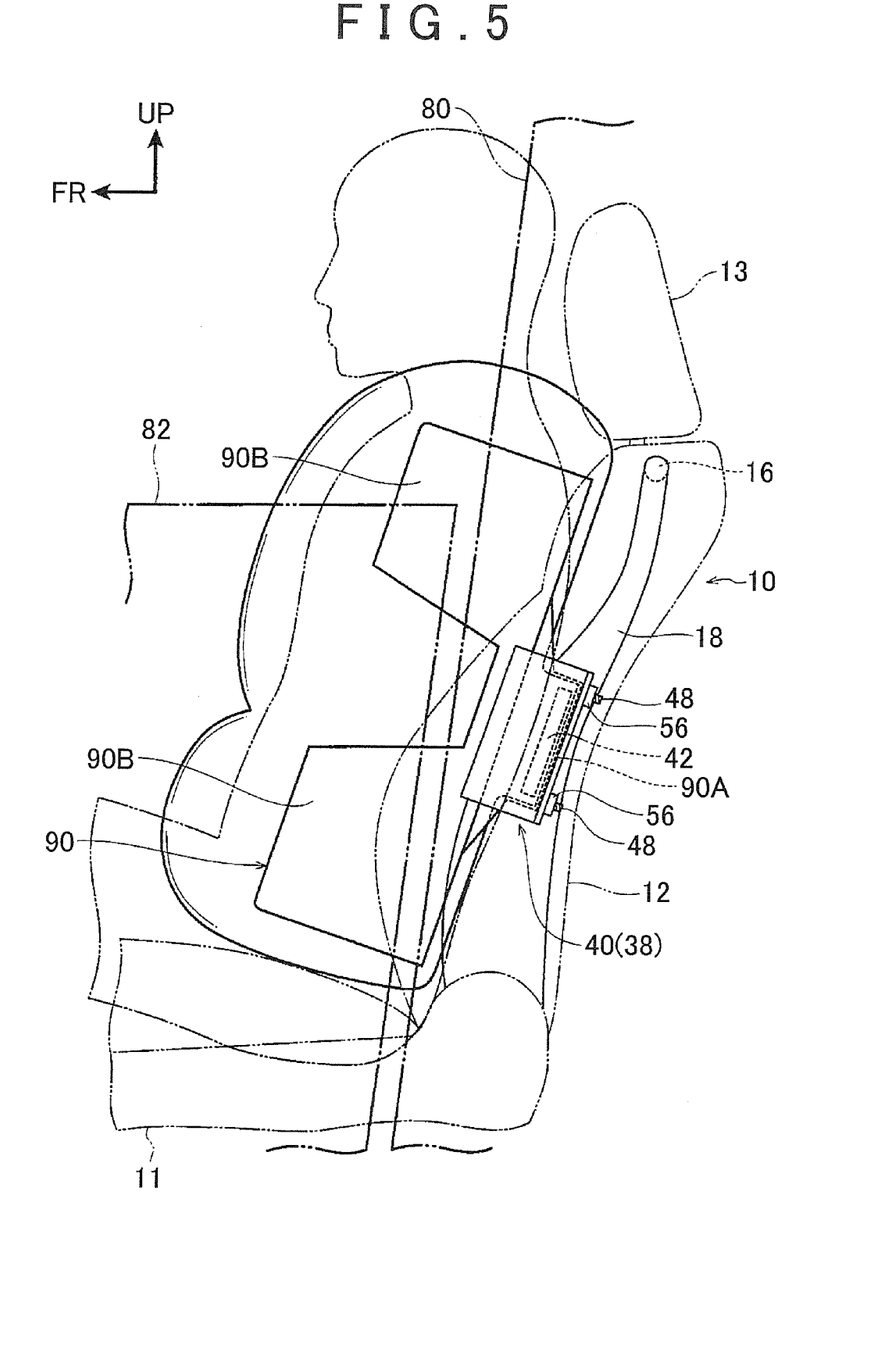
FIG. 5 is a side view corresponding to FIG. 4, of a first modified example of a deployment guiding cloth.

For example, a deployment guiding cloth 90 shown in FIG. 5, is formed by a fixed portion 90A having a similar structure as the fixed portion 60A, and a pair of upper and lower main body portions 90B that branch off and bulge out one above the other from the fixed portion 90A. The main body portion 90B on the upper side is arranged in a position corresponding to the shoulder of the occupant when viewed from the side, and the main body portion 90B on the lower side is arranged in a position corresponding to the waist of the occupant when viewed from the side.

According to this structure, the main body portions 90B of the deployment guiding cloth 90 are arranged only in a position corresponding to two locations of the shoulder and the waist of the occupant when viewed from the side. Therefore, the main body portions 90B of the deployment guiding cloth 90 are able to be quickly arranged in locations where the space 64 between the occupant and the vehicle cabin side portion is narrow, i.e., at the shoulder and the waist of the occupant. Thus, the structure shown in FIG. 5 is able to smoothly guide the inflation and deployment operation of the side airbag 46 by arranging the deployment guiding cloth 90 in a position that is particularly effective, when the space 64 between the occupant and the vehicle cabin side portion is relatively narrow.

Also, in the example embodiment described above, the deployment guiding cloth 60 and 90 use the same material as the side airbag 46, and have not undergone any particular surface treatment, but the invention is not limited to this. That is, the surface of the deployment guiding cloth 60 and 90 may also be treated. In a deployment guiding cloth 92 that serves as the deployment guiding member shown in FIG. 6, a coating layer 94 formed by applying resin material or the like is provided on a side surface on the outside in the vehicle width direction.

Figure 6:
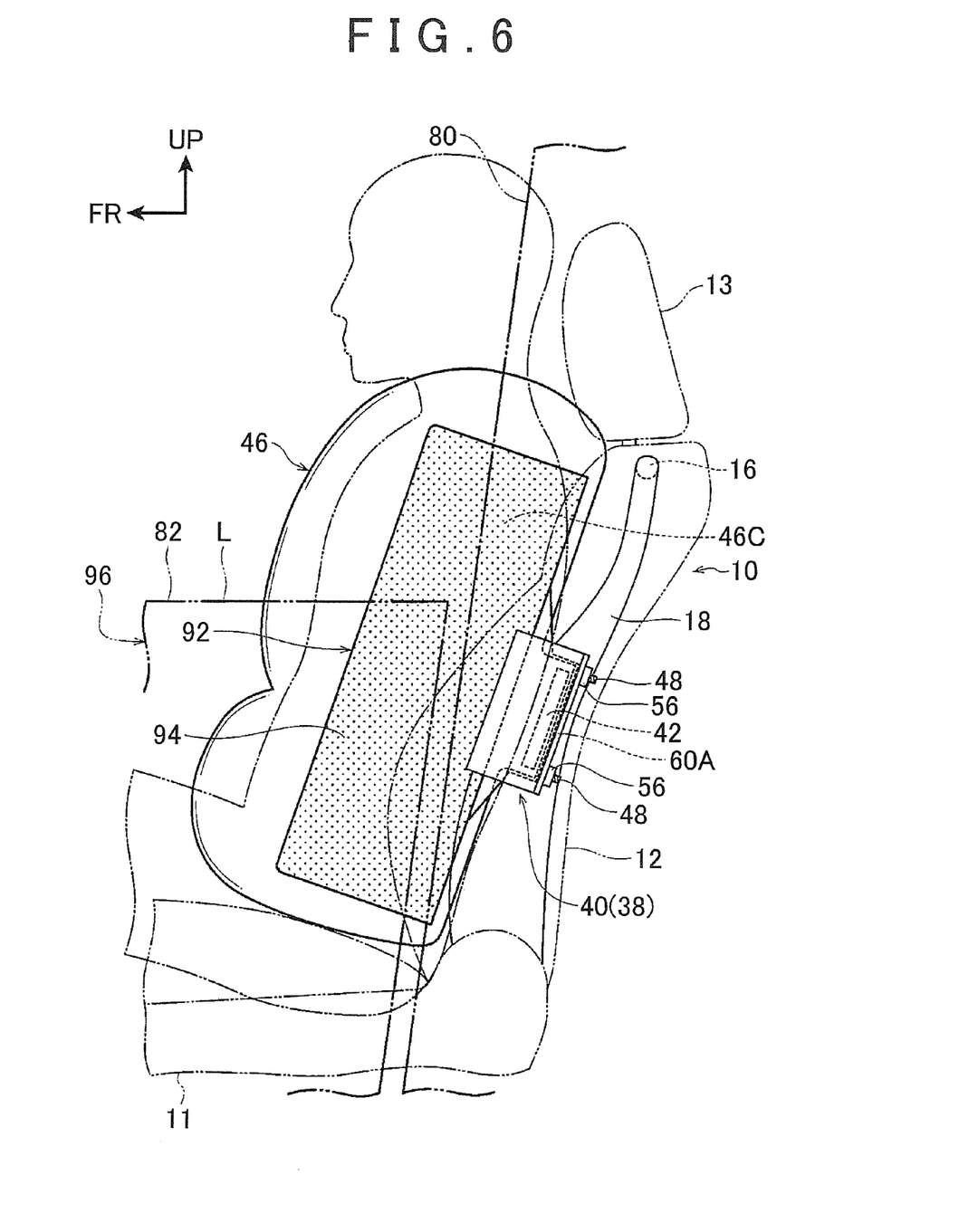
FIG. 6 is a side view corresponding to FIG. 4, of a second modified example of a deployment guiding cloth.

According to this structure, when the side airbag 46 is fully inflated and deployed, an upper end portion 46C of the side airbag 46 is arranged higher in the vehicle vertical direction than a door belt line L of a front side door 96. Therefore, if a door glass of the front side door 96 breaks, glass fragments may strike the deployment guiding cloth 92, and moreover, may also strike the outside surface of the upper end portion 46A of the side airbag 46. However, in this example embodiment, the coating layer 94 is provided on the surface on the outside in the vehicle width direction of the deployment guiding cloth 92, so the deployment guiding cloth 92 is inhibited or prevented from being damaged by the glass fragments. As a result, according to this example embodiment, it is possible to inhibit or prevent the deployment guiding cloth 90, and thus the side airbag 46, from being damaged when the side airbag 46 is made larger in the vehicle vertical direction and the upper end portion is positioned higher in the vehicle vertical direction than the door belt line L of the front side door 96.

Second Example Embodiment

Hereinafter, a vehicle side airbag device according to a second example embodiment of the invention will be described with reference to FIGS. 7B, 7C, and 7D. Component parts that are similar to those in the first example embodiment described above will be denoted by like reference characters and descriptions of those component parts will be omitted.

Figure 7A:
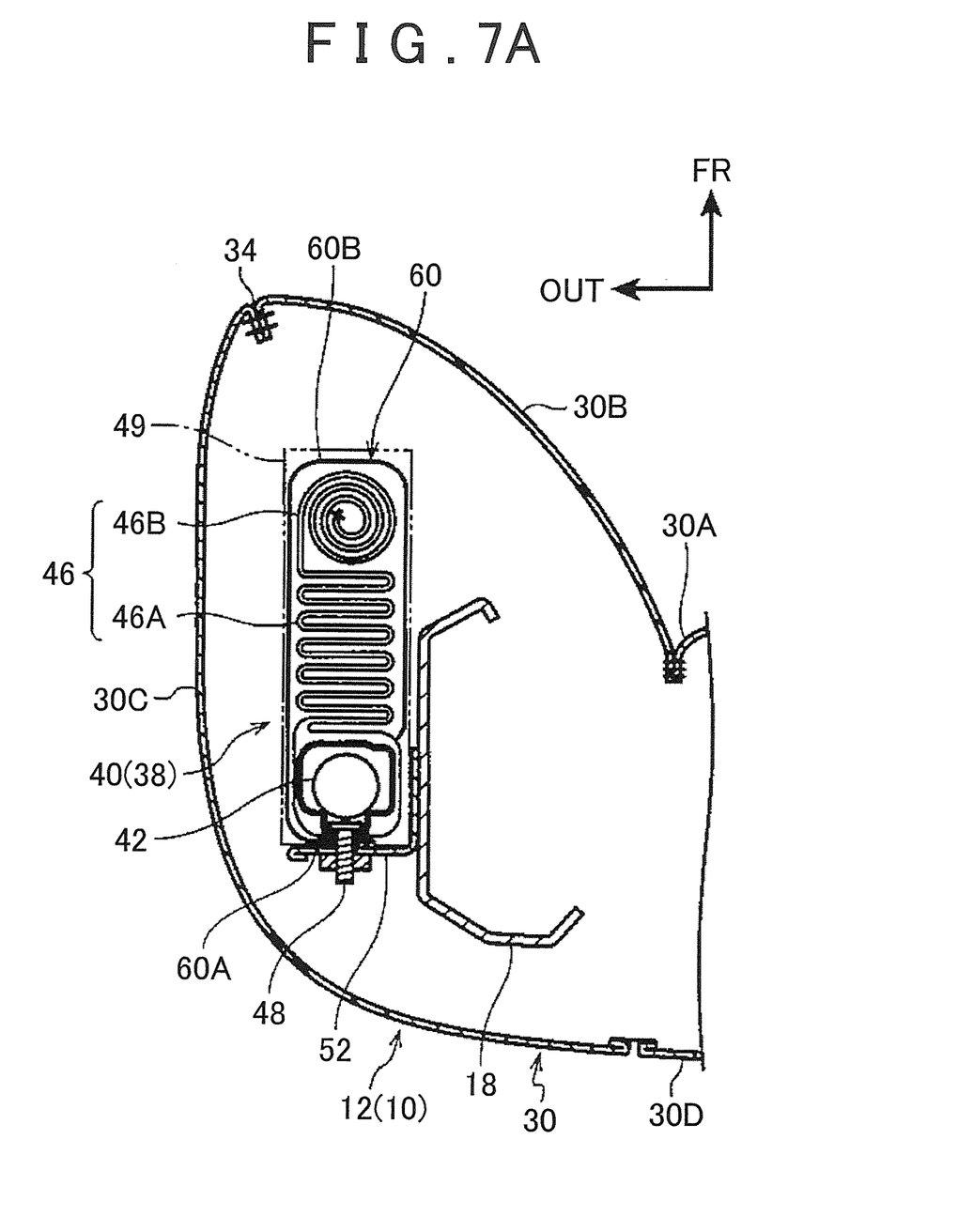
FIG. 7A is a top sectional view of a vehicle seat in which the structure of the deployment guiding cloth and the vehicle side airbag device of the first example embodiment is shown as a basis of comparison.

FIG. 7A is a comparative view of the structure of the side airbag device 38 according to the first example embodiment described above. FIGS. 7B to 7D are views of the side airbag device according to the second example embodiment to which structure that differs from that shown in FIG. 7A has been added.

Figure 7B:
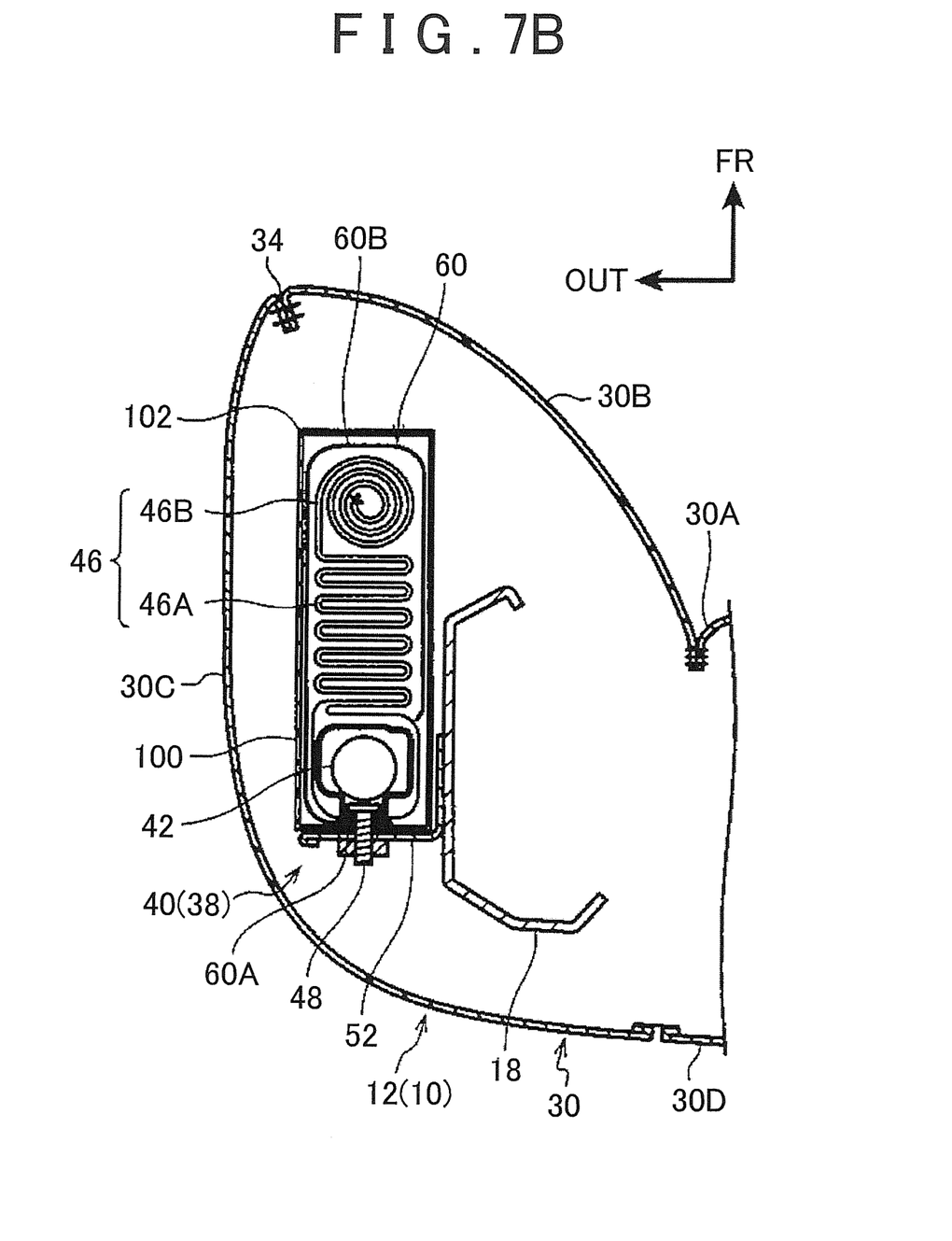
FIG. 7B is a top sectional view of a vehicle seat provided with a vehicle side airbag device according to a second example embodiment, in which an airbag module is provided with a resin airbag case.

First, in the example embodiment shown in FIG. 7B, the airbag module 40 is provided with a resin airbag case 100. This airbag case 100 has a thin rectangular parallelepiped shape, and is able to be opened and closed. Also, the airbag case 100 employs an opening and closing structure by pawl engagement at a corner portion 102 on the vehicle front side and the outside in the vehicle width direction. When the inflation pressure of the side airbag 46 reaches a predetermined pressure, the pawl engagement portion releases and the side airbag 46 deploys.

Also, in this example embodiment, the deployment guiding cloth 60 is housed along the inside surface of the airbag case 100. In other words, the stub bolts 48 protruding from the folded side airbag 46 are inserted into the bolt insertion holes in the fixed portion 60A of the deployment guiding cloth 60, and the main body portion 60B is wound around from the outside in the vehicle width direction. Then all of these are housed in the airbag case.

Figure 7C:
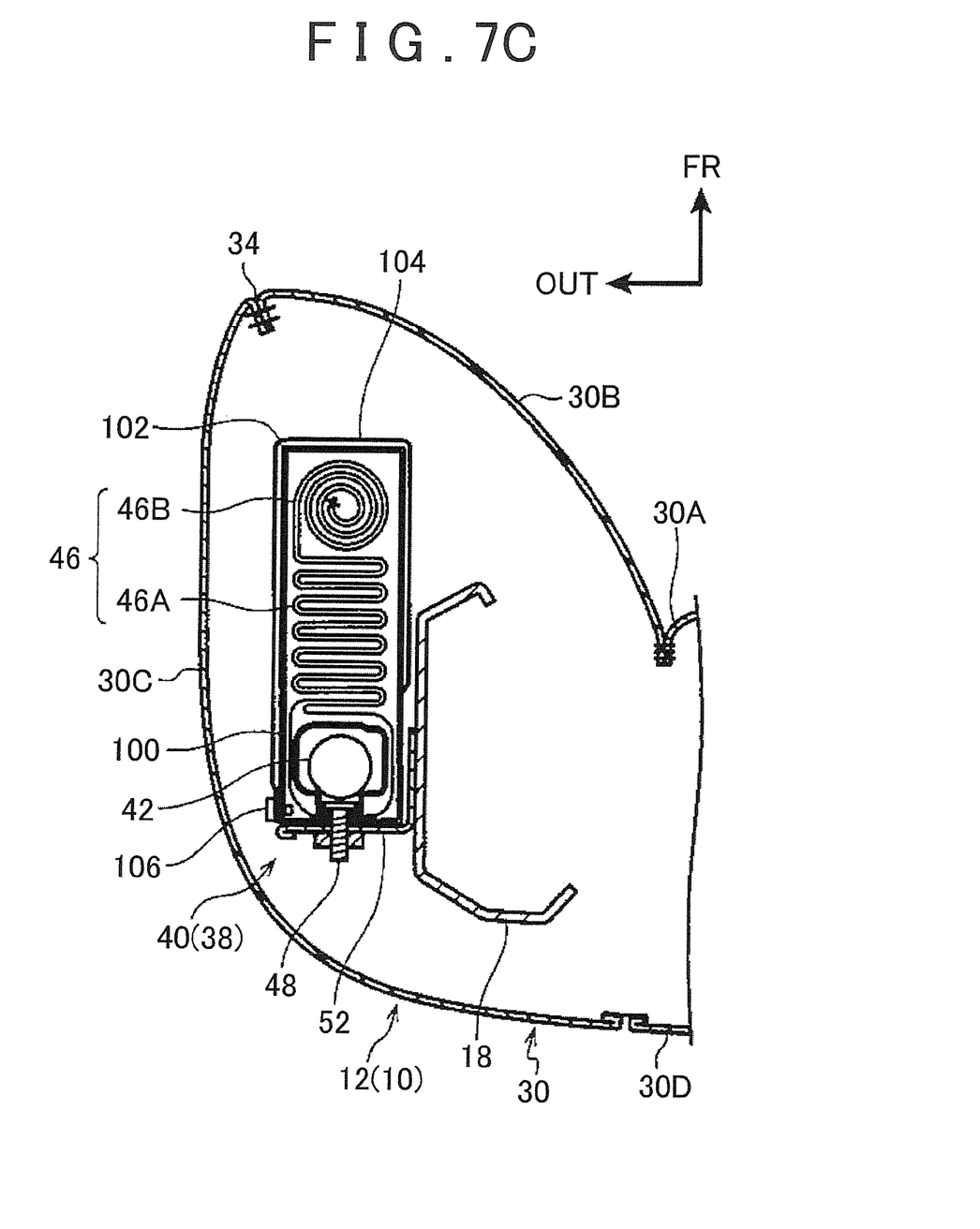
FIG. 7C is a top sectional view of the vehicle seat provided with the vehicle side airbag device according to the second example embodiment, in which the deployment guiding cloth is wound around along an outside surface of the airbag case.

In the example embodiment shown in FIG. 7C, a deployment guiding cloth 104 is wound around along the outside surface of the airbag case 100. Therefore, a base end portion of the deployment guiding cloth 104 is attached to a rear end portion of a side wall portion on the outside of the airbag case by a fixture 106.

Figure 7D:
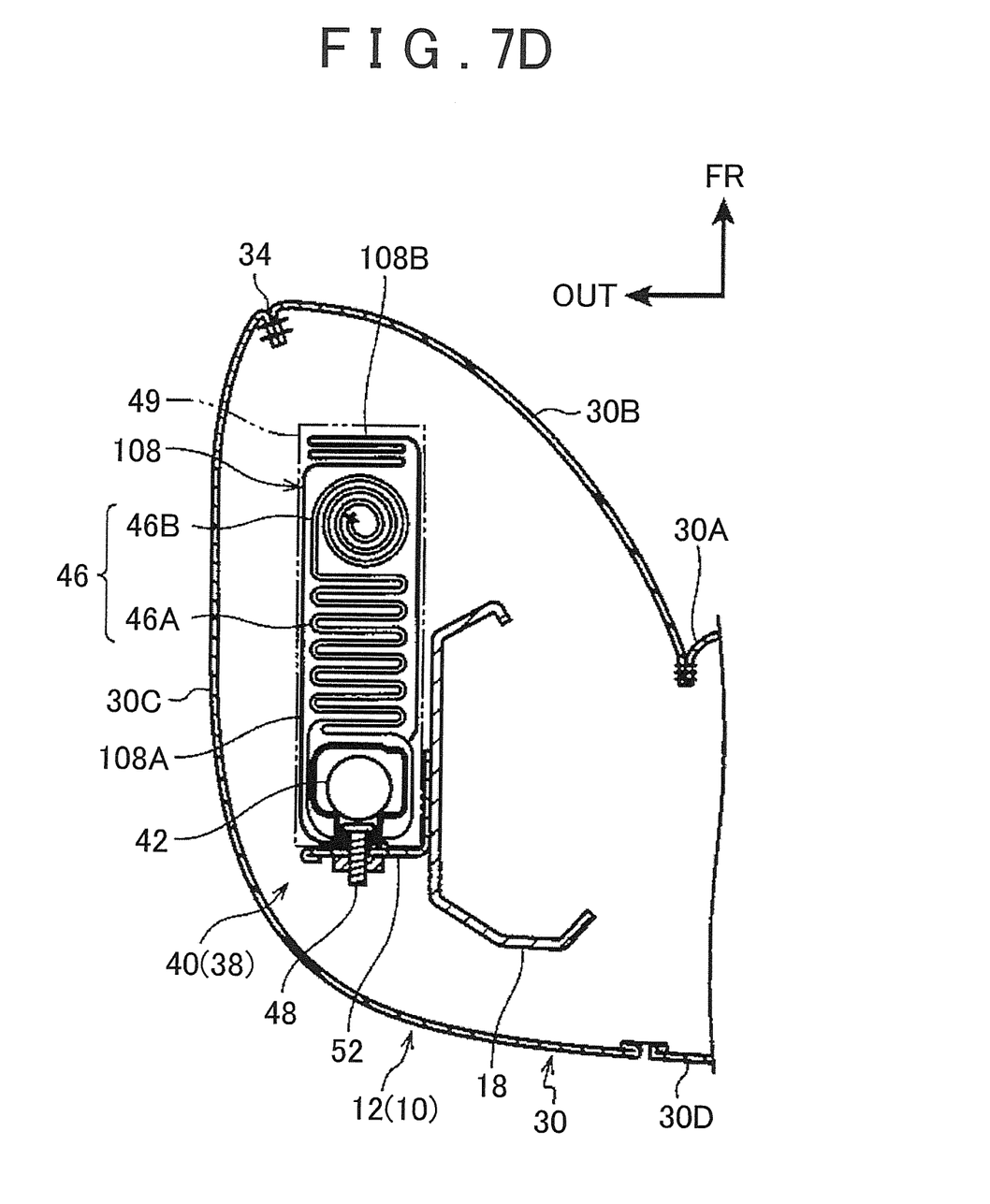
FIG. 7D is a top sectional view of the vehicle seat provided with the vehicle side airbag device according to the second example embodiment, in which a deployment length of a main body portion of the deployment guiding cloth (i.e., the length in a vehicle longitudinal direction) is longer than it is in the first example embodiment.

In the example embodiment shown in FIG. 7D, a deployment length (i.e., the length in the vehicle longitudinal direction) of a main body portion 108A of a deployment guiding cloth 108 is longer than it is in the first example embodiment described above. As an example, the deployment length of the main body portion 108A of the deployment guiding cloth 108 is set to equal to or greater than the deployment length of the side airbag 46 (i.e., the length of the side airbag 46 in the vehicle longitudinal direction when the side airbag 46 is inflated and deployed). Furthermore, a portion (a middle portion in the vehicle longitudinal direction) 108B of the main body portion 108A is accordion-folded for the amount that increased deployment length of the deployment guiding cloth 108, and is arranged on the front side in the vehicle longitudinal direction of the roll-folded portion 46B of the folded side airbag 46. In this example embodiment, the airbag case 100 is not used.

(Operation and Effects)

In the example embodiment shown in FIG. 7C, the airbag module 40 includes the airbag case 100, so it is possible to take advantage of the fact that the airbag case is used, i.e., that a reaction force surface when the side airbag 46 inflates and deploys is obtained. Furthermore, in this case, the deployment guiding cloth 60 and 104 is arranged along the inside surface or the outside surface of the airbag case 100, so the deployment guiding cloth 60 and 104 will also not wrinkle. Therefore, these example embodiments are advantageous in that they are able to inflate and deploy the side airbag 46 even more rapidly by ensuring the reaction force surface and preventing the deployment guiding cloth 60 and 104 from wrinkling.

Meanwhile, in the example embodiment shown in FIG. 7D, the deployment guiding cloth 108 is long, so deployment is able to be guided for the entire length of the deployment length of the side airbag 46. Also, even if the deployment guiding cloth 108 is long, a portion 108B thereof is accordion-folded or the like and arranged on the front side in the vehicle longitudinal direction of the folded side airbag 46, so the deployment guiding cloth 108 is able to be compactly housed, and rapid deployment of the deployment guiding cloth 108 is able to be promoted, both of which are advantageous.

In the example embodiments described above, the deployment guiding cloth 60, 90, 92, 104, and 108 is wound from the outside surface in the vehicle width direction to the inside surface in the vehicle width direction of the side airbag 46, but the invention is not limited to this. It does not matter if the deployment guiding cloth 60, 90, 92, 104, and 108 reaches the front side surface in the vehicle longitudinal direction of the side airbag or the inside in the vehicle width direction of the side airbag, as long as it is wound from the outside in the vehicle width direction of the folded side airbag. The deployment length of the deployment guiding cloth may be changed appropriately according to the deployment length of the side airbag, and how far a step is separated from the seatback in the vehicle longitudinal direction, and the like.

What is claimed is:

1. A vehicle side airbag device comprising:
an inflator that ejects gas in response to being activated;
a side airbag that is housed folded in a seatback side portion, the side airbag inflating and deploying from the seatback side portion toward a vehicle front side by the gas being supplied from the inflator; and
a deployment guiding member that is wound around the folded side airbag from an outside in a vehicle width direction, the deployment guiding member extends beyond the vehicle front side of the seatback side portion to interpose the deployment guiding member between the side airbag that is partially deployed and a vehicle cabin side portion before the side airbag is fully deployed.

2. The vehicle side airbag according to claim 1, wherein the deployment guiding member extends toward the vehicle front side beyond a centerline in a seatback vertical direction of the fully deployed side airbag.

3. The vehicle side airbag according to claim 1, wherein the side airbag has an outer shape capable of restraining from a shoulder to a waist of an occupant; and
the deployment guiding member is arranged in a position corresponding to at least one of the shoulder and the waist of the occupant when viewed from a side.

4. The vehicle side airbag according to claim 1, wherein the side airbag is housed in an airbag case.

5. The vehicle side airbag according to claim 1, wherein the side airbag is housed in a resin airbag case; and
the deployment guiding member is arranged along an inside surface or an outside surface of the airbag case.

6. The vehicle side airbag according to claim 3, wherein the deployment guiding member is arranged in a position corresponding to an area from the shoulder to the waist of the occupant when viewed from the side.

7. The vehicle side airbag according to claim 3, wherein the deployment guiding member is arranged only in a position corresponding to two locations of the shoulder and the waist of the occupant when viewed from the side.

8. The vehicle side airbag according to claim 1, wherein an upper end portion of the airbag that is fully deployed is positioned higher in a vehicle vertical direction than a door belt line of a side door; and
a coating is applied to a surface on an outside in the vehicle width direction of the deployment guiding member.

9. The vehicle side airbag according to claim 1, wherein the side airbag is folded up together with the inflator and housed in a recessed portion formed in a seatback pad; and
the deployment guiding member is arranged around the folded side airbag.

10. The vehicle side airbag according to claim 1, wherein a deployment length that is a length in a vehicle longitudinal direction of the deployment guiding member is equal to or greater than a length in the vehicle longitudinal direction of the side airbag when the side airbag is inflated and deployed.

11. The vehicle side airbag according to claim 10, wherein the deployment guiding member is arranged on a front side in the vehicle longitudinal direction of the side airbag, with a portion of the deployment guiding member in a folded state.

12. A vehicle side airbag device comprising:
an inflator that ejects gas in response to being activated;
a side airbag that is housed folded in a seatback side portion, the side airbag inflating and deploying from the seatback side portion toward a vehicle front side by the gas being supplied from the inflator; and
a deployment guiding member that is wound around the folded side airbag from an outside in a vehicle width direction, the deployment guiding portion includes a first end secured to the seatback side portion and an opposite second end that is unattached, the deployment guiding member extending toward the vehicle front side and being interposed between the side airbag that is partially deployed and a vehicle cabin side portion before the side airbag is fully deployed.

13. The vehicle side airbag according to claim 12, wherein the deployment guiding member extends toward the vehicle front side beyond a centerline in a seatback vertical direction of the fully deployed side airbag.

14. The vehicle side airbag according to claim 12, wherein the side airbag has an outer shape capable of restraining from a shoulder to a waist of an occupant; and
the deployment guiding member is arranged in a position corresponding to at least one of the shoulder and the waist of the occupant when viewed from a side.

15. The vehicle side airbag according to claim 12, wherein the side airbag is housed in an airbag case.

16. The vehicle side airbag according to claim 12, wherein the side airbag is housed in a resin airbag case; and
the deployment guiding member is arranged along an inside surface or an outside surface of the airbag case.

17. The vehicle side airbag according to claim 14, wherein the deployment guiding member is arranged in a position corresponding to an area from the shoulder to the waist of the occupant when viewed from the side.

18. A vehicle side airbag device comprising:
an inflator that ejects gas in response to being activated;
a side airbag that is housed folded in a seatback side portion, the side airbag inflating and deploying from the seatback side portion toward a vehicle front side by the gas being supplied from the inflator; and
a deployment guiding member that is wound around the folded side airbag from an outside in a vehicle width direction so as to cover an outer side of the folded side airbag, in the vehicle width direction, a front side of the folded side airbag, in a vehicle longitudinal direction, and at least a portion of an inner side of the folded side airbag, in the vehicle width direction, the deployment guiding member extending toward the vehicle front side and being interposed between the side airbag that is partially deployed and a vehicle cabin side portion before the side airbag is fully deployed.

19. The vehicle side airbag according to claim 18, wherein the deployment guiding member extends toward the vehicle front side beyond a centerline in a seatback vertical direction of the fully deployed side airbag.

20. The vehicle side airbag according to claim 18, wherein the side airbag has an outer shape capable of restraining from a shoulder to a waist of an occupant; and
the deployment guiding member is arranged in a position corresponding to at least one of the shoulder and the waist of the occupant when viewed from a side.

* * * * *